April 28, 1953      H. M. BICKLE      2,636,610

OIL FILTER

Filed July 23, 1948      2 SHEETS—SHEET 1

INVENTOR
Harry M. Bickle
By Watson, Cole, Grindle & Watson

April 28, 1953 H. M. BICKLE 2,636,610
OIL FILTER
Filed July 23, 1948 2 SHEETS—SHEET 2
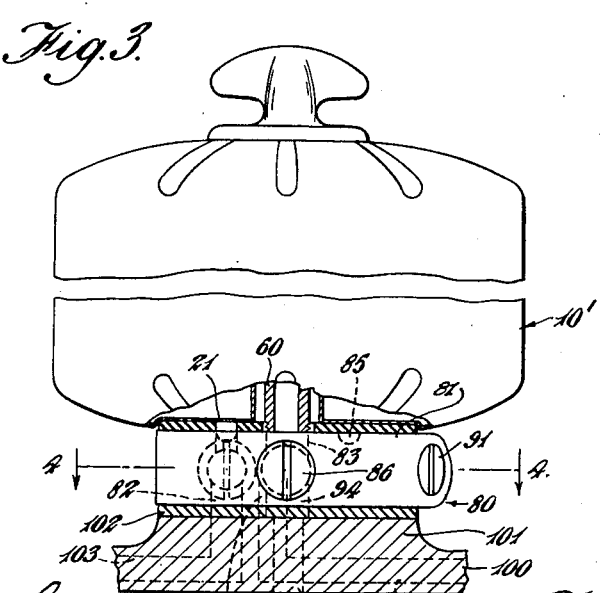
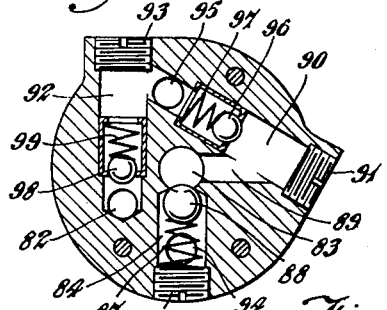
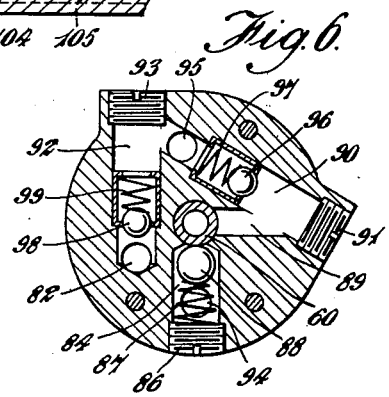
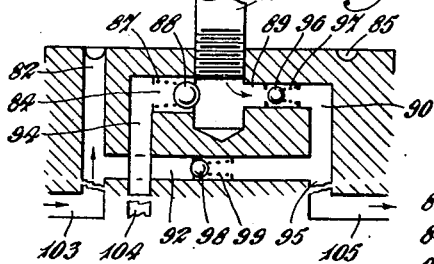
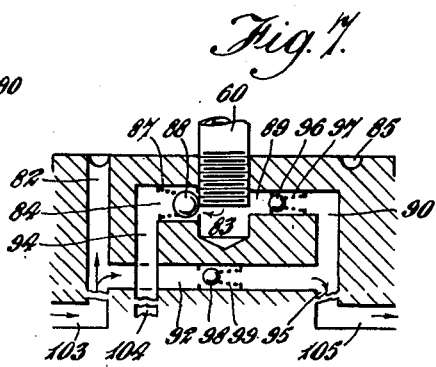
INVENTOR
Harry M. Bickle
By Watson, Cole, Grindle & Watson Patented Apr. 28, 1953

2,636,610

UNITED STATES PATENT OFFICE 2,636,610

OIL FILTER

Harry Milman Bickle, Heston, England

Application July 23, 1948, Serial No. 40,246

11 Claims. (Cl. 210—183)

This invention relates to oil filters and more particularly to oil filters for incorporation in the lubricating oil circulation system of internal combustion engines.

Oil filters included in the lubricating oil system of the engines of cars at the present time usually operate according to the by-pass system of filtration, according to which oil is bled from the pipe by which the oil is being circulated to the bearings by the oil circulation pump and is passed through the filter, the filtrate returning to the oil sump of the engine, and such oil filters usually comprise a filter casing having a tube extending centrally therethrough and serving as a conduit for the passage from the filter of the filtrate which passes into the tube from a filter medium or filter cartridge surrounding the tube, and a removable end closure member which is secured to the filter casing by a bolt screwed into the adjacent end of the central tube.

When the filter cartridge is no longer effective to remove contaminant from the oil, it is necessary to replace the filter cartridge by a fresh one. It is usually necessary, moreover, from time to time, to remove sludge from the bottom of the filter casing. The replacement of the filter cartridge and the removal of sludge from the bottom of the filter casing are hand-soiling and somewhat time-consuming operations, and the primary object of my invention is to provide an oil filter wherein the filter casing and the filter medium or filter cartridge therein form a compact and relatively cheap unitary structure which may be thrown away when the filter cartridge is no longer effective, and which can be readily secured in oil-filtering position on, and removed from, a mounting base or support for the filter.

A further object of my invention is to provide an improved oil filter assembly wherein the oil filter is removably secured to a mounting base or support therefor in such a manner that the oil filter can be readily secured to and removed from its support whilst requiring a minimum of headroom.

At certain periods during the life of an internal combustion engine, it is desirable that all the oil circulated by the oil circulation pump should be filtered before passing to the bearings and a further important object of my invention is to provide an oil filter in conjunction with a mounting base therefor which readily enables the flow of oil to be changed from that required for full-flow filtration to that required for by-pass filtration, and vice-versa, as desired.

A further and more specific object of my invention is to provide an oil filter wherein the filter casing and the filter medium or cartridge therein form a unitary structure and to provide for the filter a mounting base which contains the conduits for the passage of oil to and from the filter and which comprises valve means controlling the flow of oil such that when a filter unit suitable for full-flow filtration is secured to the mounting base the flow of oil is that required for full-flow filtration and when a filter unit suitable for by-pass filtration is secured to the mounting base the flow of oil is automatically changed to give by-pass filtration.

Another object of my invention is to provide a mounting base for an oil filter having a central filtrate-discharge tube projecting beyond one end of the filter whereby the filter may be secured to the mounting base by screwing the projecting portion of the central tube into said mounting base and to provide the mounting base with suitably-disposed oil passageways and valve control means therefor such that, depending on the extent to which the central tube extends into the mounting base, the flow of oil is such as to give either full-flow or by-pass filtration.

Further objects and advantages of my invention will be apparent from the following description of my invention read in conjunction with the accompanying drawings, in which like reference numerals denote like parts and in which:

Figure 3 is a side elevational view, partly in section, showing a mounting base adapted for either full-flow or by-pass filtration, and a filter unit suitable for full-flow filtration secured to the mounting base;

Figure 4 is a sectional view taken on line 4—4 of Figure 3;

Figure 5 is a diagrammatic view illustrating the flow of oil in the oil filter assembly shown in Figures 3 and 4;

Figure 6 is a view similar to that of Figure 4 of a filter unit adapted for by-pass filtration and secured to the mounting base shown in Figures 3 and 4, and Figure 7 is a diagrammatic view illustrating the flow of oil in the oil filter assembly shown in Figure 6.

Figure 1:
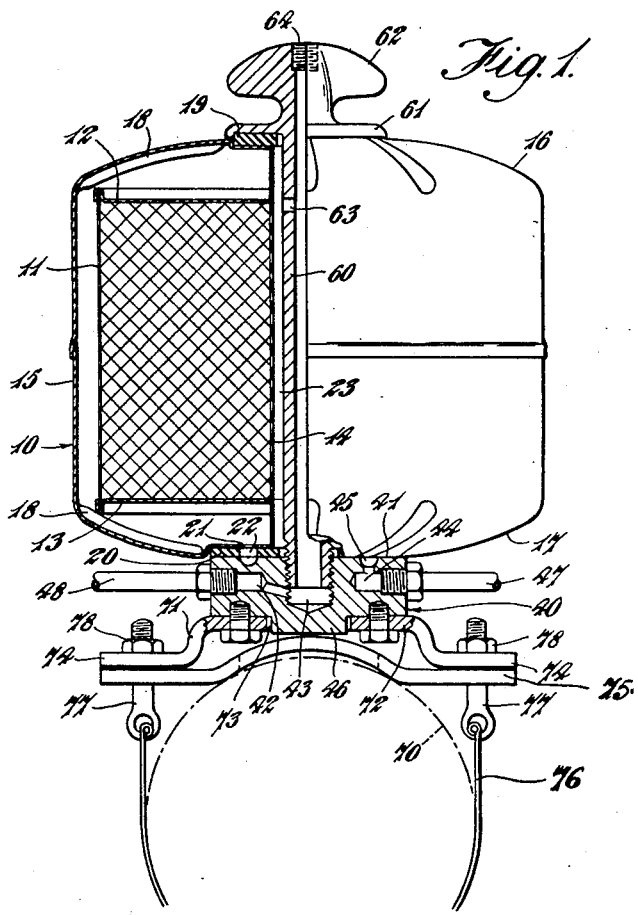
Figure 1 is a side elevational view, partly in section of an oil filter assembly comprising one form of filter unit secured to a mounting base and adapted for by-pass filtration.

In accordance with my invention I provide an oil filter comprising a casing having a side wall and integral end walls having an opening therein, and a filter means housed within the casing and having a passageway therethrough in alignment with the openings in the end walls of the casing whereby to form a passageway extending through the filter. The filter means is spaced from the casing, and one end wall of the casing, hereinafter referred to as the lower end wall, has an opening therein communicating with the space between the casing and the filter means. The filter means is sealed to the casing to prevent direct communication between said space and the passageway through the filter. The casing and the filter means form a unitary structure which, according to an important feature of my invention, is secured to a mounting base or support by means of a tubular member which extends through the passageway through the filter and which projects beyond the lower end wall of the filter casing, such projecting end of the tubular member being secured in a recess in the mounting base whereby the filter unit is firmly clamped between a clamping head on the tubular member and the mounting base. The mounting base may be in the form of a protuberance integral with the engine block or may be a separate member secured to the dash or scuttle, dynamo, engine starter or any other convenient part of a car, and it has a surface on which the lower end wall of the filter seats and oil passageways which communicate with the said opening in the lower end wall of the casing and with the passage in the tubular member. Conveniently the projecting end of the tube is externally-threaded and is screwed into the recess in the seating surface of the mounting base. Normally the oil to be filtered will flow into the filter through the opening in the lower end wall of the casing, and through the filter means, the filtrate passing into the tubular member. The flow of oil, however, may be reversed.

According to a further feature of my invention, the mounting base has a second, valve-controlled, oil outlet passageway which communicates with the said recess, and a valve-controlled passageway connecting the oil inlet passageway with the second oil outlet passageway, and the filtrate passageway is controlled by a valve which, depending on the extent to which the projecting end of the tubular members extends into the recess, is held in the open or closed position so that, in the closed position of the valve, the flow of oil is that required for full-flow filtration and in the open position of the valve the oil flow is that required for by-pass filtration. Thus, by arranging that, where an oil filter unit adapted for full-flow filtration is secured to the mounting base, the tubular member cannot project into the recess in the mounting base to such an extent that the valve in the filtrate passageway is opened, the flow of oil for full-flow filtration is automatically obtained when such a full-flow filter unit is secured to the mounting base, and by arranging that, where a similar filter unit adapted for by-pass filtration is secured to the mounting base, the tubular member projects into the recess to such an extent that the said valve is opened, the flow of oil for by-pass filtration is automatically obtained when such a by-pass filter unit is secured to the mounting base.

Referring now to Figure 1 of the drawings, the filter assembly therein shown comprises a filter unit designated generally by the reference numeral 10, a mounting base designated generally by the reference numeral 40 and a tubular securing bolt 60.

The filter unit 10 consists of a cylindrical filter cartridge housed within a cylindrical filter casing. The filter cartridge comprises a sheet metal casing having a perforate side wall 11 and centrally-apertured imperforate end walls 12 and 13. A tube 14 extends through the apertures in end walls 12, 13 to project beyond such end walls to which the tube is soldered or otherwise secured. The part of the tube extending between end walls 12, 13 is perforate and the annular space between tube 14 and side wall 11 of the casing is packed with cotton waste or other suitable filtering material, which is preferably of an adsorbent nature and impregnated with a substance adapted to aid the filtering material in coagulating and retaining impurities dispersed in the oil to be filtered.

The filter casing comprises a side wall 15 and integral, centrally-apertured end walls 16, 17 having strengthening flutes 18. The filter casing may conveniently be formed by welding, soldering or otherwise securing two cupped-shaped sheet metal members together, mouth to mouth. The end walls 16, 17 of the casing are inwardly-cupped adjacent the openings in such end walls to form recesses to receive gaskets 19, 20 respectively, and the ends of the tube 14 of the filter cartridge are soldered or otherwise secured to end walls 16, 17 adjacent such openings. The filter casing and the filter cartridge form a filter unit that is a unitary structure and that has an axial passage 23 therethrough. The lower end wall 17 of the filter casing has an opening 21 in registration with an opening 22 in gasket 20.

The mounting base 40 provides a seating surface 41 for the filter unit 10 and has a transverse oil passageway 42 communicating with the lower part of a threaded recess 43 in the surface 41, and an oil passageway 44 communicating with an annular groove 45 in the surface 41, this groove registering with the opening 21 in the lower end wall 17 of the filter casing. The lower end wall of the mounting base has a boss 46.

The filter unit 10 is removably secured to the mounting base 40 by means of a tubular bolt 60 which extends through the axial passage 23 through the filter unit in spaced relationship to tube 14 and which projects beyond the lower end wall 17 of the filter casing, such projecting end being screwed into the recess 43 so that the filter unit is firmly clamped between the mounting base and the clamping head 61 of the bolt, the gaskets 19, 20 preventing any leakage of oil from the ends of tube 14. The bolt may be provided with opposed wings 62 forming a convenient finger grip for turning the bolt. The bolt 60 is preferably tubular throughout its length, the bore of the bolt at its upper end being closed by a grub screw 64.

The oil filter assembly above described may be readily secured to any convenient support. For example, as shown in Figure 1, the assembly may be secured to the dynamo or engine starter motor 70 of a car by means of a channel-shaped mounting member 71 whose web 72 is bolted to the bottom of the mounting base 40 with the boss 46 thereof received in an opening 73 in such web and which has outwardly-extending flanges 74 which engage a bearing plate 75 seated on the dynamo or motor 70, the filter assembly being firmly clamped to the dynamo or motor 70 by means of a wire or strap 76 embracing the dynamo or motor and secured to eye bolts 77 that extend through aligned apertures in the bearing plate 75 and flanges 74 and that are secured by nuts 78.

With the filter assembly secured to its support, part of the oil circulated by the oil circulation pump of the car engine is passed by pipe 47 connected to oil passageway 44, through annular groove 45, through opening 21 in the filter casing, and into the space surrounding the filter cartridge, and thence into the filter cartridge. The filtrate flows into tube 14, through opening 63 in tubular bolt 60, and downwardly through the bolt and through passageway 42 to pipe 48 which conducts the filtrate to the engine sump. Any air trapped in the filter casing may be removed therefrom by temporarily removing grub screw 64.

When the filter cartridge is no longer effective to clean the oil, the securing bolt 60 is unscrewed, and the filter unit is withdrawn from the bolt and thrown away, and replaced by a new filter unit. It will be noticed that, in order to dismount the filter unit, it is not necessary to lift the filter unit upwardly from the mounting base and that the securing bolt need only be given an upward movement sufficient to disengage the bolt from the recess 43. This is of great advantage where the filter assembly is mounted beneath the bonnet or hood of the car engine or in any other place where there is only limited headroom. The unitary structure afforded by the filter casing and the filter cartridge therein, in conjunction with my novel means of securing the filter unit to its support, enables the filter cartridge to be changed most expeditiously with little danger of oil coming into contact with the hands. Moreover, any sludge that has collected in the bottom of the filter casing is automatically and cleanly disposed of when changing the filter cartridge. The filter unit, if desired, may include detergent, sludge-dispersing, de-gumming and other agents so that when a filter unit is changed, a fresh supply of such agents is automatically given to the lubricating oil system.

Figure 2:
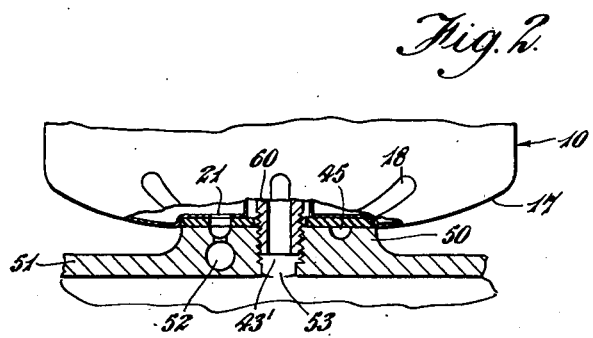
Figure 2 is a partial side elevational view, partly in section, of a modified oil filter assembly, showing the filter unit of Figure 1 secured to a different mounting base.

In Figure 2, the oil filter unit 10 is shown secured to a mounting base 50 integral with the engine block 51, oil to be filtered passing from a passageway 52 in the mounting base or protuberance 50 to the annular groove 45 whence it passes to the filter cartridge through opening 21 in the lower end wall 17 of the filter casing, the filtrate passing through tubular bolt 60 into the recess 43' from which it flows directly to the engine sump through a passageway 53 in the wall of the engine block.

In Figures 3 and 4 of the drawings there is shown an oil filter unit 10', which is the same as that shown in Figure 1 except that the filter means is suitable for full-flow filtration, imposing a lower resistance to the passage of oil than the filter cartridge of Figure 1, and a mounting base 80 for the filter unit, such mounting base comprising valve-controlled passageways such that the flow of oil is that required for full-flow filtration but can be changed when desired to that required for by-pass filtration. The mounting base 80 is shown bolted to a protuberance 101 on an engine block 100, a gasket 102 being interposed between the protuberance 101 and the mounting base 80.

The mounting base provides a seating surface 81 for the filter unit and this seating surface has an annular groove 85 that communicates with a vertical oil inlet passageway 82 in the mounting base, such passageway communicating with a passageway 103 in the engine block and receiving the oil circulated by the oil circulation pump. The tubular bolt 60 of the filter unit is screwed into a recess 83 in the seating surface of the mounting base 80 whereby the filter unit is firmly secured to the mounting base, and a radial oil outlet passageway 84 in the mounting base communicates with recess 83. The outer end of passageway 84 is closed by a plug 86 whilst the inner end of the passageway provides a seat for a ball valve 88 which is urged by a spring 87 to its closed position in which the ball valve projects somewhat into recess 83. A vertical passageway 94 in the mounting base communicates with passageway 84 and with a passageway 104 in the engine block that serves to conduct oil to the engine sump. A second radial oil outlet passageway 89 in the mounting base communicates with recess 83 and intersects a transverse passageway 90 which is closed at one end by plug 91 and which at its other end communicates with a vertical passageway 95 and with a passageway 92 that is closed at its outer end by plug 93 and that communicates with vertical passageway 82. Vertical passageway 95 in the mounting base communicates with a further passageway 105 in the engine block, that serves to conduct oil to the bearings and other parts to be lubricated.

Passageway 90 contains a housing for a ball valve 96 that is urged against its seat by spring 97, and passageway 92 contains a housing for a ball valve 98 that is urged against its seat by spring 99.

The height of the filter unit 10' is such that, with the filter clamped tightly to its seat by bolt 60, the end of the bolt does not extend sufficiently into recess 83 to engage valve 88 and lift it off its seat, and the operation of the oil filter assembly shown in Figures 3 and 4 is as follows. Oil from the oil circulation pump passes through passageways 103 and 82 (see more particularly Figure 5), into annular groove 85, and through opening 21 in the lower end wall 17 of the filter casing and into the filter casing, the bias pressure exerted by spring 99 being such that valve 98 is normally held closed. Oil passes through the low resistance filter means, and the filtrate passes into the tubular bolt 60, into recess 83 and through passageways 89, 90, 95 and 105 to the bearings and other parts to be lubricated, the pressure of the oil in recess 83 opening valve 96 against the light resistance imposed by spring 97, but being normally insufficient to overcome the relatively high pressure exerted by spring 87 on valve 88 which remains closed. Should the filter means become choked, the resistance to the passage of oil therethrough will be such that valve 98 will be opened and oil will pass directly from passageway 103 to passageway 105. Should excessive pressure develop within the filter unit, valve 88 will be opened to allow oil to pass directly from the filter unit through passageways 84, 94 and 104 to the engine sump.

When it is desired to change from full-flow filtration to by-pass filtration the full-flow filter unit 10' is removed, this being readily effected by unscrewing bolt 60 as previously explained with reference to Figure 1, and a by-pass filter unit is secured to the mounting base. This by-pass filter unit may be identical with the full-flow filter unit except that the filter means thereof gives a relatively high resistance to oil flow therethrough and the height of the filter unit is such that, when the filter unit is firmly clamped by the secural bolt 60 to the mounting base 80, the lower end of the bolt 60 projects into the recess 83 sufficiently to engage valve 88 and hold it off its seat, as shown in Figure 6. With a by-pass filter unit secured to mounting base 80, the flow of oil is as follows. As seen more clearly in Figure 7, oil passes from passageway 103 through passageway 82 and into the filter casing, as in the case of full-flow filtration described with reference to Figures 3 to 5, but due to the high resistance to oil-flow given by the by-pass filter means, the pressure developed in passageway 103 is sufficient to force ball valve 98 off its seat, so that oil also passes from passageway 103 directly to passageway 105 and thence to the bearings and other parts to be lubricated. The oil passing into passageway 105 also flows into passageway 90 and holds ball valve 96 to its seat. Filtrate from the filter means flows into tube 60, into recess 83 and thence through passageways 84, 94 and 104 to the engine sump. Thus part of the oil in passageway 103 flows directly to the bearings to be lubricated, the remainder of the oil passing to the filter unit from which the filtrate flows to the engine sump. If desired, a suitable restrictor may be included at a suitable point in the by-pass system to prevent excessive flow of oil through the filter unit.

I claim:

1. An oil filter comprising a casing having a side wall and integral upper and lower end walls each having an opening therein, and a filter means housed within the casing and having a tube extending through the filter means and projecting beyond the ends thereof, said projecting ends of the tube being imperforate and being secured directly to the end walls of the casing adjacent the openings therein and terminating at said end walls, said tube within the filter means being perforate, said filter means being spaced from the casing, and the lower end wall of the casing having an opening communicating with the space between the casing and the filter means, whereby oil may flow through said last named opening and through said filter means and thence into said tube.

2. An oil filter comprising a casing having a cylindrical side wall and integral upper and lower end walls each having a central opening therein, and a cylindrical filter cartridge housed within the casing and spaced from the side wall thereof and having a tube extending axially through the cartridge and projecting beyond the ends thereof, said projecting ends of the tube being imperforate and being secured directly to the end walls of the casing adjacent the openings therein and terminating at said end walls, said tube being perforate only within the filter cartridge, and the lower end wall of the casing having a further opening communicating with the space between the side wall of the casing and the filter cartridge, whereby oil may flow through said last named opening and through said filter means and thence into said tube.

3. In combination, an oil filter comprising a casing having a side wall and upper and lower end walls each having an opening therein, and a filter means housed within the casing and having a passageway through the filter means in alignment with the openings in the end walls of the casing whereby to form a passageway extending through the filter, a mounting base for the filter, said mounting base having a surface on which the lower end wall of the casing seats and having a recess formed in the base and opening into such surface in alignment with the passageway through the filter, and a clamping member extending through the said passageway and removably securing the filter to its mounting base, said clamping member having a clamping surface at its upper end and at its lower end extending into and being secured in the recess in the seating surface of the mounting base, whereby the oil filter is clamped between the said seating surface and the said clamping surface of the clamping member, said casing having an opening therein communicating with the peripheral portion of said filter means, whereby oil may flow through said filter means between said last named opening and said first named openings.

4. In combination, an oil filter comprising a casing having a side wall and upper and lower end walls each having an opening therein, and a filter means housed within the casing and having a passageway through the filter means in alignment with the openings in the end walls of the casing whereby to form a passageway through the filter, said filter means being spaced from the casing, means between said casing and said filter means to prevent direct communication between the passageway through the filter and the space between the side wall of the casing and the filter means, and the lower end wall of said casing having a further opening therein communicating with said space, a mounting base for the filter, said mounting base having a surface on which the lower end wall of the casing seats, and having a recess formed in the base and opening into said seating surface in alignment with the passageway through the filter, and a passageway communicating with the said further opening in the lower end wall of the casing, and a tubular bolt extending through the passageway through the filter and screwed into the recess in the seating surface of the mounting base whereby the filter is removably clamped between such seating surface and the head of the bolt, said bolt being spaced from the filter means and having an opening in the wall thereof placing the passageway through the filter means in communication with the bore of the bolt.

5. The combination with an oil filter comprising a casing having an upper end wall and a lower end wall with an opening therein, filter means housed within the casing, and a tubular member extending through the casing and through the filter means and projecting beyond the end walls of the casing, the upper projecting end of the tubular member having a clamping surface, of a mounting base for said filter, said mounting base having a surface on which the lower end wall of the oil filter is seated, and having a recess formed in the base and opening into said surface, in which the lower projecting end of the tubular member is received, said base having therein an oil passageway communicating with the opening in the lower end wall of the casing and a second oil passageway communicating with said recess, said casing and filter means forming a unit that is removably secured in assembled relationship with said mounting base by said tubular member.

6. The combination as claimed in claim 5, wherein the said mounting base has a third, valve-controlled, passageway communicating with said recess, a fourth, valve-controlled, passageway connecting the first and third oil passageways, and valve means for controlling flow of oil through said second oil passageway.

7. The combination as claimed in claim 5, wherein the said second oil passageway has a spring-pressed ball valve held open by the projecting lower end of said tubular member and the mounting base comprises a third, valve-controlled, oil passageway communicating with said recess, and a fourth, valve-controlled passageway connecting the first and third oil passageways.

8. In combination, a mounting base and an oil filter mounted thereon, said mounting base having a surface providing a seat for the filter, said base having an internally-threaded recess opening into said surface and an opening spaced from said recess, an oil passageway communicating with said opening, a second oil passageway communicating with said recess, a third, valve-controlled, oil passageway communicating with said recess, a fourth, valve-controlled, oil passageway connecting the first and third oil passageways, and valve means controlling flow of oil through the second oil passageway and comprising means extending into the recess and adapted to be engaged by a tube extending from the oil filter and screwed into the recess, whereby the valve is moved to open position by said tube.

9. In combination, a mounting base and an oil filter mounted thereon, said base having a surface providing a seat for the filter, said base having a recess formed in said base and opening into said surface, and having an opening spaced from said recess, an oil passageway communicating with said opening, a second oil passageway communicating with said recess, a spring-pressed ball valve controlling flow of oil through said second oil passageway and projecting into said recess, a third oil passageway communicating with said recess, valve means controlling flow of oil through the third oil passageway, a fourth oil passageway connecting the first and third oil passageways, and valve means controlling flow of oil through the fourth oil passageway.

10. In combination, an oil filter comprising a casing having a cylindrical side wall and integral upper and lower end walls having a central opening therein, and a cylindrical filter cartridge housed within the casing and spaced from the side wall thereof and having a tube extending axially through the cartridge and projecting beyond the ends thereof, said projecting ends of the tube being secured to the end walls of the casing adjacent the openings therein, said tube being perforate only within the filter cartridge, and the lower end wall of the casing having a further opening communicating with the space between the side wall of the casing and the filter cartridge, a mounting base for the filter, said mounting base having a surface on which the lower end wall of the casing seats, and having a recess formed in the base and opening into said surface in alignment with said tube, and an oil passageway communicating with said further opening in the lower end wall of the casing, and a tubular bolt extending through the said tube in spaced relationship thereto and screwed into said recess to clamp the filter between the head of the bolt and the mounting base and to removably secure the filter to the mounting base, said tubular bolt having an opening in the wall thereof placing the interior of the tube in communication with the bore of the bolt.

11. The combination as claimed in claim 10, wherein the mounting base has a second oil passageway communicating with said recess, a ball valve in said second oil passageway, a spring urging the ball valve into a closed position in which the valve projects into said recess, a third, valve-controlled oil passageway communicating with said recess, and a fourth, valve-controlled passageway connecting the first and third oil passageways.

HARRY MILMAN BICKLE.

References Cited in the file of this patent

UNITED STATES PATENTS

| Number | Name | Date |
|---|---|---|
| 1,339,769 | Leigh | May 11, 1920 |
| 1,624,526 | Bohmsack | Apr. 12, 1927 |
| 1,901,484 | Winslow et al. | Mar. 14, 1933 |
| 1,913,401 | Liddel | June 13, 1933 |
| 2,031,935 | Cuno | Feb. 25, 1936 |
| 2,059,358 | Johnson et al. | Nov. 3, 1936 |
| 2,076,935 | Burckhalter | Apr. 13, 1937 |
| 2,108,798 | Dalrymple | Feb. 22, 1938 |
| 2,134,385 | Winslow | Oct. 25, 1938 |
| 2,253,686 | Burckhalter | Aug. 26, 1941 |
| 2,314,640 | Winslow et al. | Mar. 23, 1943 |
| 2,480,108 | Barker | Aug. 30, 1949 |
| 2,487,146 | Lasky | Nov. 8, 1949 |
| 2,533,266 | Kovacs et al. | Dec. 12, 1950 |